United States Patent
Horiuchi

Patent Number: 5,225,937
Date of Patent: Jul. 6, 1993

[54] ZOOM LENS
[75] Inventor: Akihisa Horiuchi, Kanagawa, Japan
[73] Assignee: Canon Kabushiki Kaisha, Tokyo, Japan
[21] Appl. No.: 623,556
[22] Filed: Dec. 7, 1990
[30] Foreign Application Priority Data
Dec. 11, 1989 [JP] Japan ................................. 1-322344
[51] Int. Cl.$^5$ .............................................. G02B 15/14
[52] U.S. Cl. .................................. 359/688; 359/676; 359/686
[58] Field of Search ................. 359/676, 686, 688, 694
[56] References Cited

U.S. PATENT DOCUMENTS

| | | | |
|---|---|---|---|
| 4,525,036 | 6/1985 | Fujibayashi et al. | 359/688 |
| 4,618,219 | 10/1986 | Sugiura et al. | 359/688 |
| 4,802,747 | 2/1989 | Horiuchi | 350/427 |
| 4,832,471 | 5/1989 | Hamano | 350/427 |
| 4,846,563 | 7/1989 | Mukaiya | 350/427 |
| 4,854,684 | 8/1989 | Horiuchi | 350/427 |
| 4,892,397 | 1/1990 | Horiuchi | 350/425 |
| 4,934,796 | 6/1990 | Suguira et al. | 350/427 |
| 4,988,174 | 1/1991 | Horiuchi et al. | 350/427 |

FOREIGN PATENT DOCUMENTS 1-120521 5/1989 Japan .
1-120522 5/1989 Japan .

Primary Examiner—Bruce Y. Arnold
Assistant Examiner—Hung Xuan Dang
Attorney, Agent, or Firm—Fitzpatrick, Cella, Harper & Scinto

[57] ABSTRACT

A zoom lens is disclosed comprising, from front to rear, a first lens unit of positive power, a second lens unit of negative power, a third lens unit of negative power and a fourth lens unit of positive power, zooming being performed by moving the second and third lens units axially in differential relation, whereby the focal length F2 of the second lens unit lies in the following range:

$$0.09 < |F2/FT| < 0.14$$

where FT is the longest focal length of the entire lens system. With this, though the optical total length is shorter than ever, the zoom lens gets a higher range of variation of the focal length.

12 Claims, 7 Drawing Sheets

ZOOM LENS

BACKGROUND OF THE INVENTION

1. Field of the Invention

This invention relates to zoom lenses and, more particularly, to zoom lenses having an F-number of 2.0, an increased zoom ratio to about 8, and a good optical performance over the entire extended zooming range, with a relatively few number of constituent lenses constructed in simple form to a small size and a light weight, suited to photographic cameras, video cameras, etc.

2. Description of the Related Art

In the photographic camera, video camera, etc., the demand for zoom lenses of large relative aperture, high range and a high optical performance has been growing.

Of these, for example, a zoom lens for home video camera, which in view of an increase of the number of resolving cells of the image pickup element such as a CCD and an improvement of the recording technique such as S-VHS, high-band 8 mm, etc., is required to heighten its resolving power over the entire area of the image frame to, for example, 50 lines/mm in the spatial frequency.

Among the zoom lenses, there is a so-called 4-unit zoom lens comprising, from front to rear, a first lens unit of positive refractive power for focusing, a second lens unit of negative refractive power for varying the image magnification, a third lens unit of positive or negative refractive power for compensating for the shift of an image plane resulting from the variation of the magnification, and a fourth lens unit of positive refractive power for forming an image. Since this type allows the zoom ratio and the aperture ratio to be increased with relative ease, it has been employed in various kinds of cameras.

A proposal for increasing the range of the 4-unit zoom lens to about 6 has been made in, for example, Japanese Laid-Open Patent Applications Nos. Hei 1-120521 and Hei 1-120522. In addition there are U.S. Pat. Nos. 4,832,471, 4,846,563 and 4,934,796, and U.S. patent application Ser. No. 475,749 filed on Feb. 6, 1990.

In these publications, for every lens unit, proper rules of design are set forth to obtain a relatively good optical performance over the entire zooming range. But, because the refractive power of the first lens unit or the second lens unit is somewhat weak, the total length of the complete lens tends to become long.

With the use of the 4-unit type in the zoom lens design, to allow a minimization of the size of the entire lens system, the refractive power of every lens unit and the construction and arrangement of the members of the first lens unit and the zooming lens unit must be optimized. Otherwise, the variation of aberrations would be caused to increase, making it difficult to obtain a good optical performance throughout the entire zooming range.

SUMMARY OF THE INVENTION

A first object of the invention is to provide a zoom lens of short optical total length and shortened diameter in the first lens unit.

A second object is to provide a zoom lens which, though getting as high a zoom ratio as about 8, maintains good stability of optical performance throughout.

BRIEF DESCRIPTION OF THE DRAWINGS

In the drawings, I, II, III and IV denote respectively the first, second, third and fourth lens units. $\Delta M$ represents the meridional image surface, and $\Delta S$ represents the sagittal image surface. d stands for the d-line, g for the g-line, and SP for the stop.

DETAILED DESCRIPTION OF THE PREFERRED EMBODIMENTS

Figure 1:
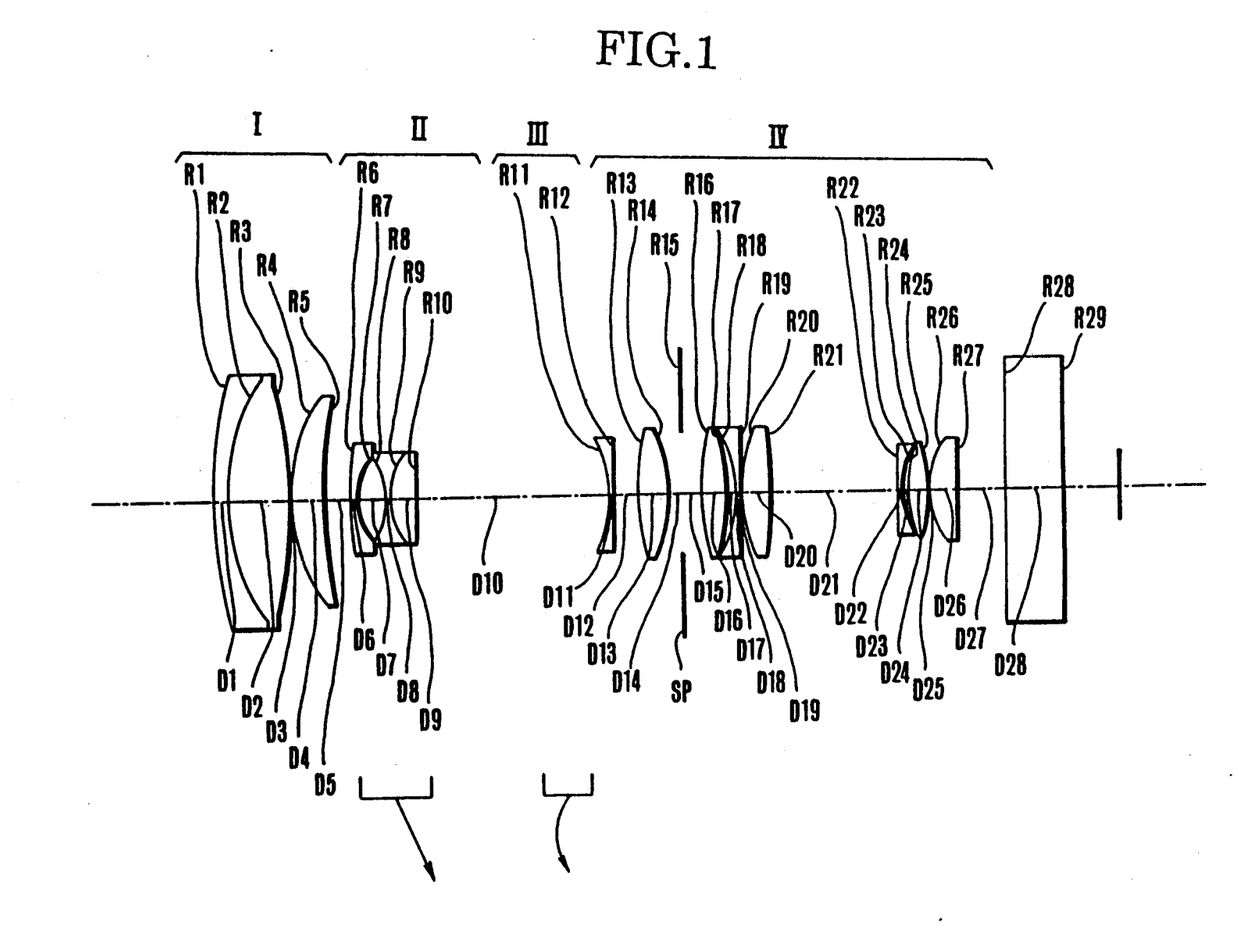
FIG. 1 is a longitudinal section view of a numerical example 1 of a zoom lens of the invention.
Figure 2A:
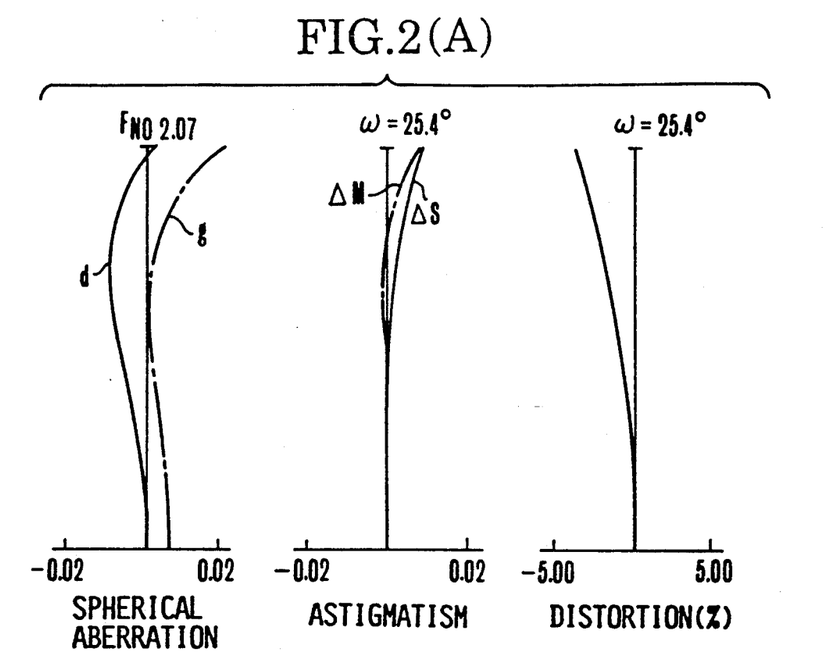
FIGS. 2(A), 2(B) and 2(C), FIGS. 3(A), 3(B) and 3(C), FIGS. 4(A), 4(B) and 4(C) and FIGS. 5(A), 5(B) and 5(C) are graphic representations of the aberrations of numerical examples 1 to 4 of zoom lenses of the invention respectively. Of the aberration graphs, the ones whose figure numbers are suffixed (A) are in the wide-angle end, the ones whose figure numbers are suffixed (B) in the intermediate position, and the ones whose figure numbers are suffixed (C) in the telephoto end.
Figure 2B:
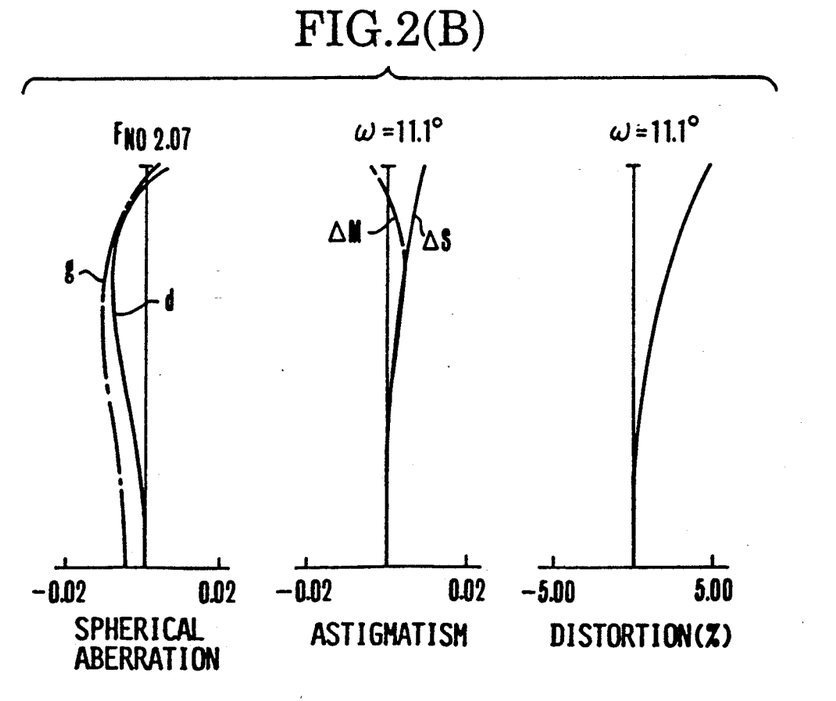
Figure 2C:
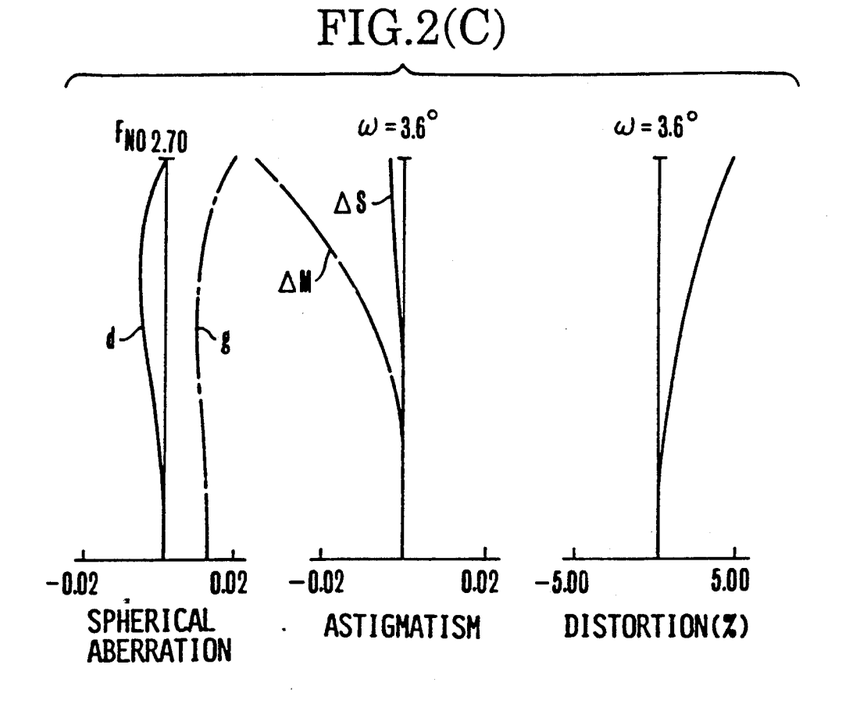

FIG. 1 in lens block diagram shows an embodiment of the zoom lens according to the invention comprising, from front to rear, a first lens unit I of positive refractive power for focusing, a second lens unit II of negative refractive power which, when zooming from the wide-angle end to the telephoto end, moves monotonously rearward, a third lens unit III of negative refractive power which, when zooming from the wide-angle end to the telephoto end, moves axially on a locus convex toward the front to keep constant the position of an image plane, and a fourth lens unit IV of positive refractive power which remains stationary during zooming and performs the image forming function, with a fixed stop SP positioned within the fourth lens unit IV.

Further, the present invention sets forth the following condition:

$$0.01 < (F1^2 \cdot F_{NOT} \tan \omega T)/FT^2 < 0.049 \qquad (1)$$

where, F1 is the focal length of the first lens unit, and FT, $F_{NOT}$ and $\omega T$ are respectively the focal length of the entire lens system, the F-number at full open aperture and the half angle of view, in the telephoto end.

In the present embodiment, since the first, second and third lens units are arranged as described above, and the refractive power of the first lens unit lies in the range given by the inequalities of condition (1), the zoom lens has a relatively small total number of lens elements, an F-number of about 2 and the range of variation of the focal length increased to about 8 while well correcting the variation of aberrations with zooming. Thus, a 4-unit zoom lens having good stability of high optical performance throughout the entire zooming range is achieved.

Further, the first and second lens units are provided with cemented lens surfaces to correct chromatic aberrations.

Next, the technical significance of the above-described condition is explained.

The inequalities of condition (1) give a proper range for the refractive power of the first lens unit and have an aim to minimize the bulk and size of the entire lens system while still permitting good correction of all aberrations to be performed.

When the refractive power of the first lens unit is weak as exceeding the upper limit of the condition (1), aberration correction becomes easy to perform, but the interval between the first lens unit and the stop increases largely. To receive the off-axial light beam, the diameter of the first lens unit must be increased. When the refractive power of the first lens unit is strong as exceeding the lower limit, the total length of the complete lens becomes short, but its distance from the second lens unit shortens to increase the possibility of occurrence of physical interference therebetween. Further, the variation with focusing of the aberrations comes to increase. So, that is not good.

To achieve a further improvement of the stability of aberration correction, it is recommended that the first lens unit is constructed from a cemented lens of positive refractive power having a cemented surface convex toward the front and a meniscus-shaped positive lens convex toward the front, the second lens unit is constructed from a negative lens whose rear surface is of strong curvature and a cemented lens of negative refractive power having a cemented surface convex toward the front, and the third lens unit is constructed from a negative lens whose front surface is concave toward the front.

In the zoom lens according to the invention, under the various conditions described above, the following conditions for the focal lengths F2 and F3 of the second and third lens units respectively are satisfied:

$$0.09 < |F2/FT| < 0.14 \tag{2}$$

$$0.45 < |F3/FT| < 0.65 \tag{3}$$

These are preferable in reducing the variation of aberrations with zooming when the good stability of optical performance over the entire zooming range is obtained.

The inequalities of condition (2) give a proper range for the negative refractive power of the second lens unit and aim to get a predetermined increase of the zoom ratio and to achieve a shortening of the total length of the entire lens, particularly at the zooming section, with the limitation of the variation of aberration with zooming to a minimum.

When the refractive power of the second lens unit is weak as exceeding the upper limit, the required total movement of the second lens unit for securing the prescribed zoom ratio increases largely, which in turn causes the physical length of the zooming section to increase and the interval between the first lens unit and the stop to increase. To receive the off-axial light beam, the diameter of the first lens unit then increases objectionably. When the refractive power of the second lens unit is too strong and beyond the lower limit, the total movement of the second lens unit becomes short when the prescribed zoom ratio is secured. So, the total length of the complete lens gets short. However, the variation with zooming of aberrations is caused to increase objectionably.

The inequalities of condition (3) are concerned with the negative refractive power of the third lens unit and have an aim that as the third lens unit comprises only one lens of negative refractive power whose front surface is concave toward the front, the varying aberrations are corrected in good balance, and another aim to prevent the diameter of the front member of the first lens unit from increasing in the wide-angle end.

When the negative refractive power of the third lens unit is too weak as exceeding the upper limit, the total zooming movement of the third lens unit is caused to increase largely, thereby elongating the total length of the entire lens system. At the same time, the diameter of the front member of the first lens unit in the wide-angle end is increased largely.

When the negative refractive power of the third lens unit is too strong as exceeding the lower limit, the Petzval sum increases largely in the negative direction. So, the astigmatism comes to increase objectionably.

All the conditions given above suffice for accomplishing the objects of the invention. To further improve such a zoom lens by correcting the varying aberrations in good balance throughout the entire zooming range, it is preferred to satisfy the following condition:

$$1.1 < |(R_{III2}+R_{III1})/(R_{III2}-R_{III1})| < 1.6 \tag{4}$$

where $R_{IIIi}$ is the radius of curvature of the i-th lens surface, when counted from the front, in the aforesaid third lens unit.

The inequalities of condition (4) are concerned with figuration of the single lens of negative refractive power constituting the third lens unit. When the lower limit is exceeded, the higher-order spherical aberrations increase in the positive direction, and large outward coma is produced. This should be avoided.

When the upper limit is exceeded, the reverse results are effected. That is, the higher-order spherical aberrations increase in the negative direction, and large inward coma is produced. This makes it difficult to obtain high optical performance.

Besides this, the invention is to reduce the amount of image aberrations at any station in the zooming range, thus affording a high optical performance to attain. For this purpose, the fourth lens unit is constructed as follows:

The fourth lens unit is divided into two parts with the widest air spacing being the boundary, namely, in the order from the object side, a front lens sub-unit and a rear lens sub-unit. The front lens sub-unit is constructed from four lenses, that is, a positive first lens having a rear refracting surface of strong convex curvature toward the image side, a positive second lens having a front refracting surface of convex curvature toward the object side, a negative third lens having a front refracting surface of strong convex curvature toward the object side, and a positive fourth lens having a front refracting surface of strong convex curvature toward the object side. The rear lens sub-unit is constructed from three lenses, that is, a negative fifth lens having a rear refracting surface of strong concave curvature toward the image side, a positive sixth lens of bi-convex form, and a positive seventh lens. And, letting the focal length of the fourth lens unit be denoted by F4, the focal lengths of the front lens sub-unit and the rear lens sub-unit by F4-1 and F4-2 respectively, and the focal length of the i-th lens, when counted from the front, in the fourth lens unit by F4,i, the following conditions are satisfied:

$$0.62 < F4\text{-}1/F4 < 0.83 \tag{5}$$

$$0.27 < |F4,5/F4\text{-}2| < 0.36 \tag{6}$$

The inequalities of condition (5) are concerned with the refractive power of the front lens sub-unit and chiefly aim to correct spherical aberration. When the positive refractive power is too strong and exceeds the lower limit, the zonal spherical aberration on the wide-angle side comes to increase. When the positive refractive power is too weak as exceeding the upper limit, over-correction of spherical aberration results and, further, the outer diameter of the rear lens sub-unit increases objectionably.

The inequalities of condition (6) are concerned with the ratio of the negative refractive power of the fifth lens to the positive refractive power of the rear lens sub-unit and have an aim to correct chiefly off-axial aberrations in good balance.

When the negative refractive power of the fifth lens is too strong as exceeding the lower limit, large higher order astigmatisms are produced. When the negative refractive power of the fifth lens is too weak as exceeding the upper limit, negative distortion increases. This becomes difficult to correct well.

Incidentally, the term "front refracting surface of strong curvature" used above means that its refractive power is stronger than that of the other lens surface, that is, the rear lens surface. The same applies to the rear refracting surface of strong curvature.

Numerical examples 1 to 4 of zoom lenses of the invention are shown below. In the numerical examples 1 to 4, Ri denotes the radius of curvature of the i-th lens surface or air separation, when counted from the front, and Ni and $\nu i$ are respectively the refractive index and Abbe number of the glass of the i-th lens element, when counted from the front. Incidentally, R28 and R29 define a glass block such as face plate or filter.

The values of the factors in the above-described conditions (1) to (6) for the numerical examples 1 to 4 are listed in Table-1.

Numerical Example 1 (FIGS. 1, 2(A), 2(B) and 2(C))
F = 1–7.5   FNo = 1:2.07–2.70   $2\omega$ = 50.9°–7.3°

| R1 = 8.293 | D1 = 0.1585 | N1 = 1.80518 | $\nu 1$ = 25.4 |
| R2 = 3.212 | 2 = 0.7017 | N2 = 1.51633 | $\nu 2$ = 64.1 |
| R3 = −7.244 | D3 = 0.0226 | | |
| R4 = 2.643 | D4 = 0.3735 | N3 = 1.69680 | $\nu 3$ = 55.5 |
| R5 = 8.515 | D5 = Variable | | |
| R6 = 5.457 | D6 = 0.0792 | N4 = 1.77250 | $\nu 4$ = 49.6 |
| R7 = 1.046 | D7 = 0.3327 | | |
| R8 = −1.254 | D8 = 0.0792 | N5 = 1.69680 | $\nu 5$ = 55.5 |
| R9 = 1.255 | D9 = 0.2943 | N6 = 1.84666 | $\nu 6$ = 23.9 |
| R10 = 21.076 | D10 = Variable | | |
| R11 = −2.415 | D11 = 0.905 | N7 = 1.69680 | $\nu 7$ = 55.5 |
| R12 = −16.551 | D12 = Variable | | |
| R13 = 6.146 | D13 = 0.3282 | N8 = 1.65844 | $\nu 8$ = 50.9 |
| R14 = −2.310 | D14 = 0.1698 | | |
| R15 = Stop | D15 = 0.2264 | | |
| R16 = 3.354 | D16 = 0.3169 | N9 = 1.62374 | $\nu 9$ = 47.1 |
| R17 = −4.677 | D17 = 0.0949 | | |
| R18 = −2.126 | D18 = 0.1019 | N10 = 1.84666 | $\nu 10$ = 23.9 |
| R19 = −41.309 | D19 = 0.0170 | | |
| R20 = 2.570 | D20 = 0.2943 | N11 = 1.63854 | $\nu 11$ = 55.4 |
| R21 = −7.703 | D21 = 1.5181 | | |
| R22 = 102.170 | D22 = 0.0792 | N12 = 1.83400 | $\nu 12$ = 37.2 |
| R23 = 1.346 | D23 = 0.0865 | | |
| R24 = 4.212 | D24 = 0.2151 | N13 = 1.51633 | $\nu 13$ = 64.1 |
| R25 = −2.881 | D25 = 0.0170 | | |
| R26 = 1.362 | D26 = 0.2943 | N14 = 1.57099 | $\nu 14$ = 50.8 |
| R27 = −154.621 | D27 = 0.5659 | | |
| R28 = ∞ | D28 = 0.6791 | N15 = 1.51633 | $\nu 15$ = 64.1 |
| R29 = ∞ | | | |

| Variable | Focal Length | | |
| Separation | 1.0 | 2.4 | 77.5 |
| D5 | 0.11 | 1.29 | 2.11 |
| D10 | 2.28 | 0.72 | 0.34 |
| D12 | 0.18 | 0.56 | 0.12 |

Figure 3A:
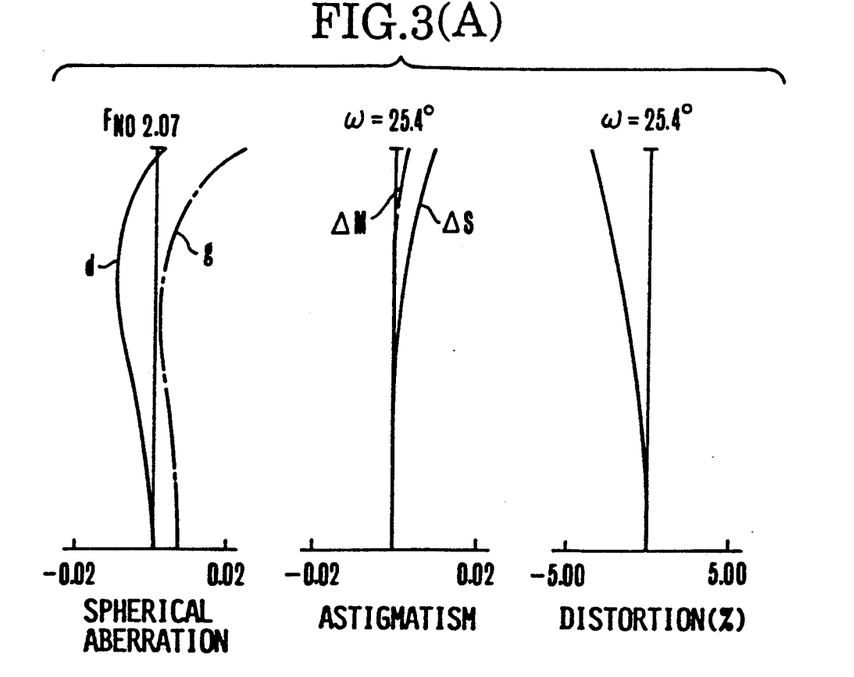
Figure 3B:
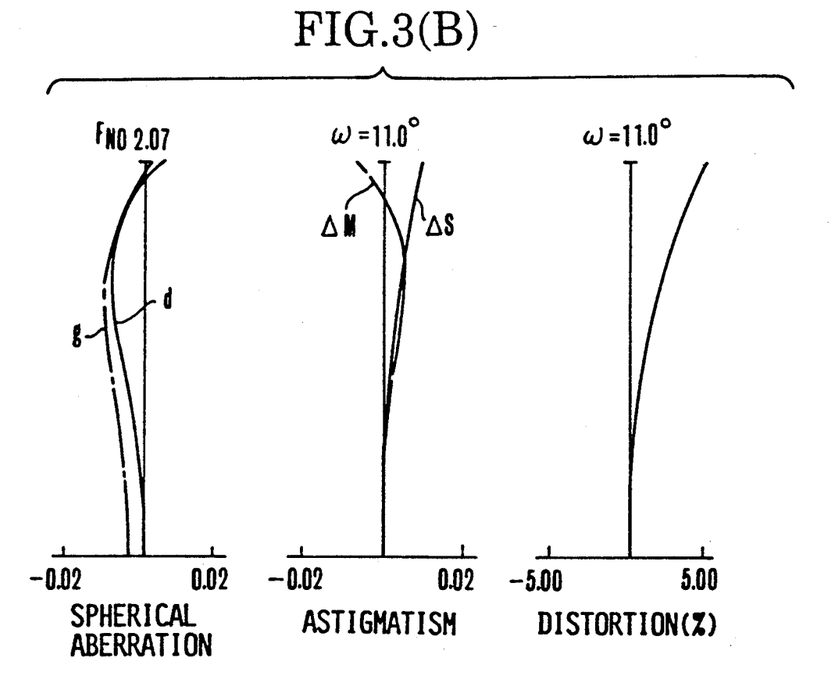
Figure 3C:
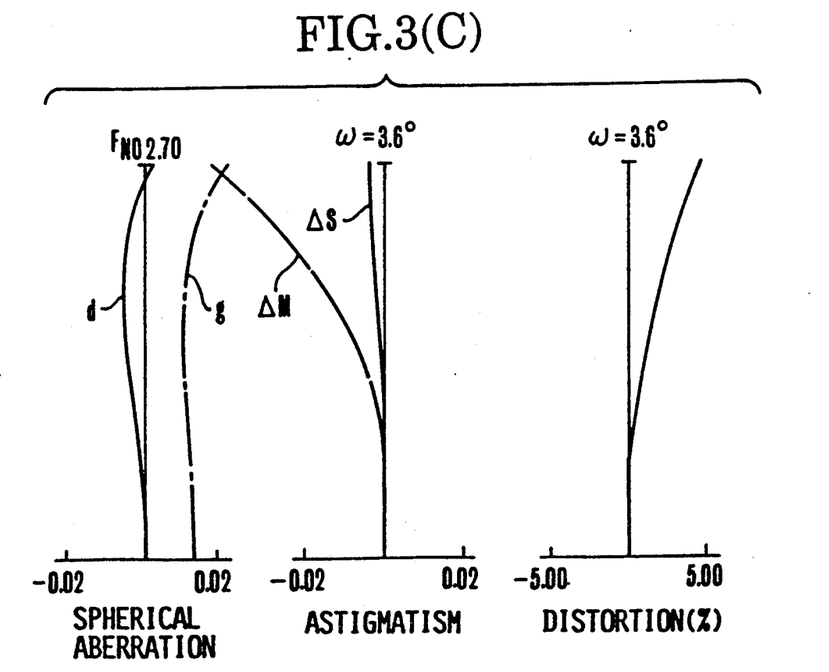

Numerical Example 2 (FIGS. 3(A), 3(B) and 3(C))
F = 1–7.5   FNo = 1:2.07–2.70   $2\omega$ = 50.8°–7.3°

| R1 = 8.244 | D1 = 0.1582 | N1 = 1.80518 | $\nu 1$ = 25.4 |
| R2 = 3.189 | D2 = 0.7232 | N2 = 1.51633 | $\nu 2$ = 64.1 |
| R3 = −7.262 | D3 = 0.0226 | | |
| R4 = 2.653 | D4 = 0.3842 | N3 = 1.69680 | $\nu 3$ = 55.5 |
| R5 = 8.741 | D5 = Variable | | |
| R6 = 5.670 | D6 = 0.0791 | N4 = 1.77250 | $\nu 4$ = 49.6 |
| R7 = 1.038 | D7 = 0.3386 | | |
| R8 = −1.258 | D8 = 0.0791 | N5 = 1.69680 | $\nu 5$ = 55.5 |
| R9 = 1.258 | D9 = 0.2938 | N6 = 1.84666 | $\nu 6$ = 23.9 |
| R10 = 25.443 | D10 = Variable | | |
| R11 = −2.426 | D11 = 0.0904 | N7 = 1.69680 | $\nu 7$ = 55.5 |
| R12 = −17.306 | D12 = Variable | | |
| R13 = 5.417 | D13 = 0.3277 | N8 = 1.65844 | $\nu 8$ = 50.9 |
| R14 = −2.422 | D14 = 0.1695 | | |
| R15 = Stop | D15 = 0.2034 | | |
| R16 = 3.137 | D16 = 0.3164 | N9 = 1.62374 | $\nu 9$ = 47.1 |
| R17 = −5.485 | D17 = 0.1028 | | |
| R18 = −2.097 | D18 = 0.1017 | N10 = 1.84666 | $\nu 10$ = 23.9 |
| R19 = −36.647 | D19 = 0.0169 | | |
| R20 = 2.519 | D20 = 0.2938 | N11 = 1.63854 | $\nu 11$ = 55.4 |
| R21 = −7.300 | D21 = 1.5284 | | |
| R22 = 98.119 | D22 = 0.0791 | N12 = 1.83400 | $\nu 12$ = 37.2 |
| R23 = 1.287 | D23 = 0.0882 | | |
| R24 = 3.990 | D24 = 0.2147 | N13 = 1.51633 | $\nu 13$ = 64.1 |
| R25 = −2.868 | D25 = 0.0169 | | |
| R26 = 1.291 | D26 = 0.2938 | N14 = 1.57099 | $\nu 14$ = 50.8 |
| R27 = 108.960 | D27 = 0.5650 | | |
| R28 = ∞ | D28 = 0.6780 | N15 = 1.51633 | $\nu 15$ = 64.1 |
| R29 = ∞ | | | |

| Variable | Focal Length | | |
| Separation | 1.0 | 2.4 | 7.5 |
| D5 | 0.11 | 1.29 | 2.10 |
| D10 | 2.27 | 0.71 | 0.35 |
| D12 | 0.18 | 0.56 | 0.12 |

Figure 4A:
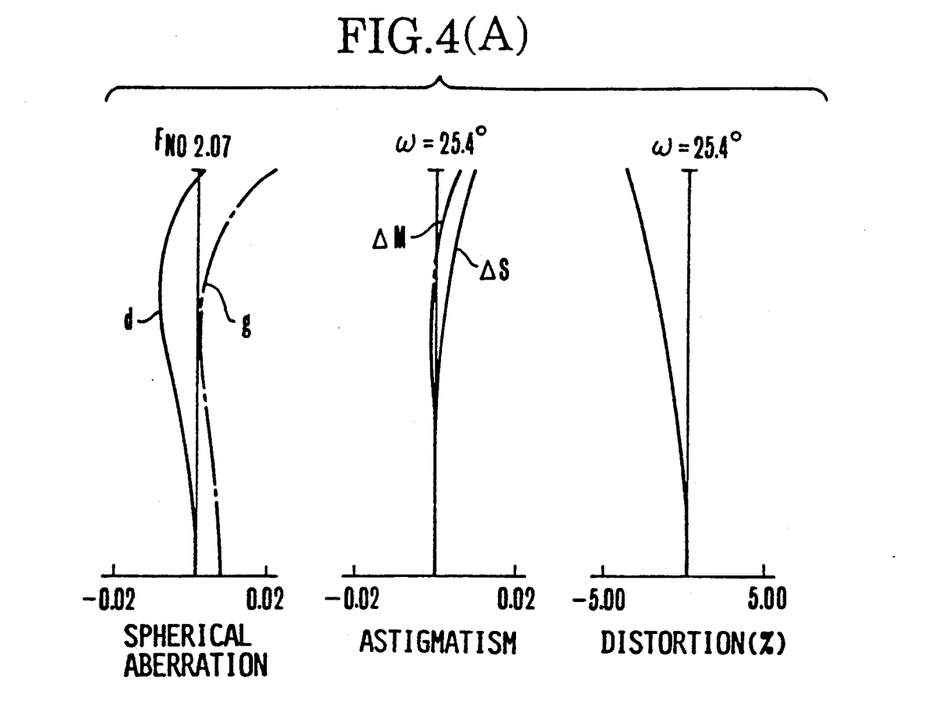
Figure 4B:
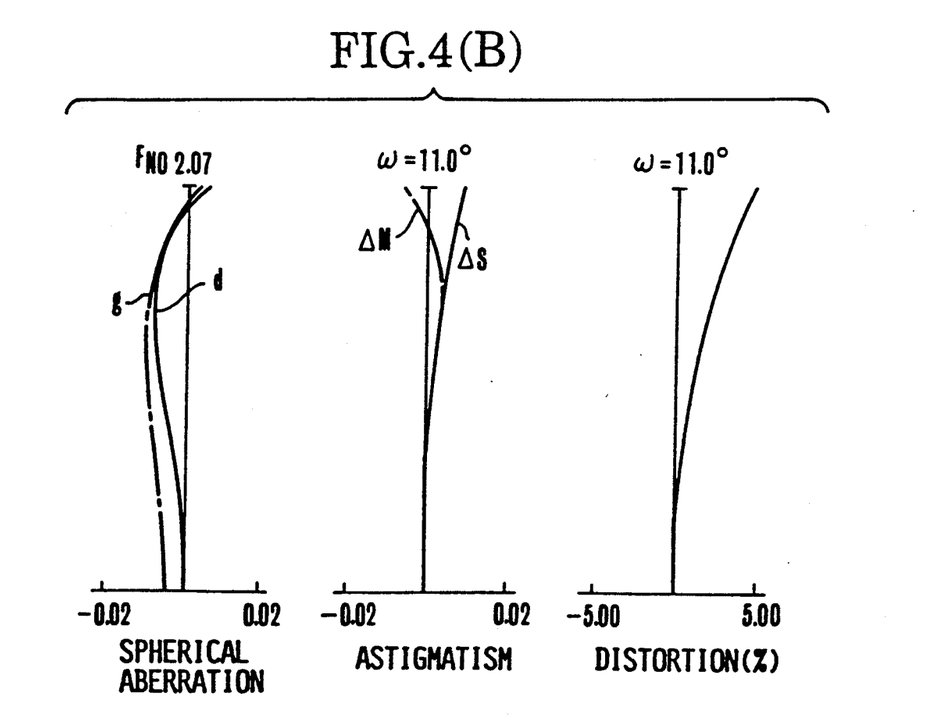
Figure 4C:
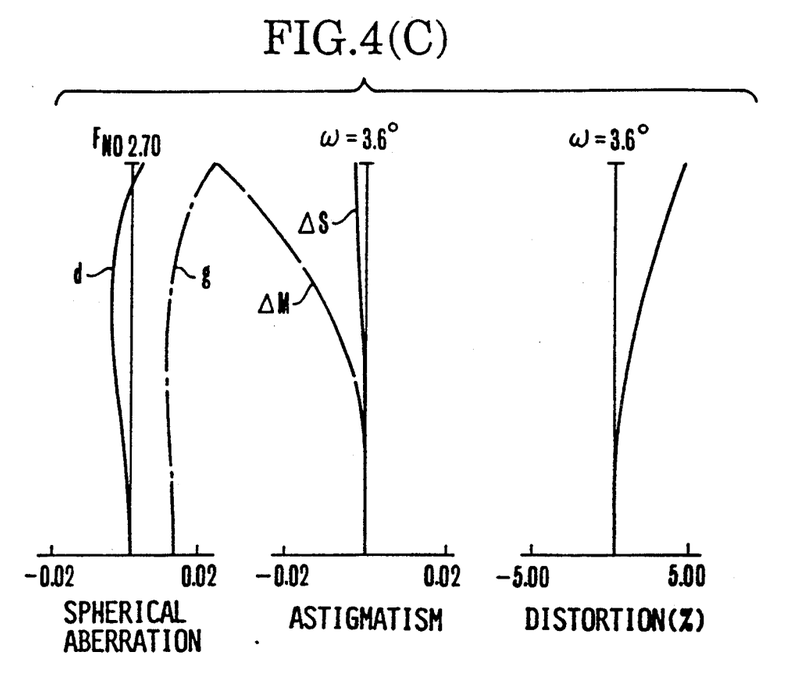

Numerical Example 3 (FIGS. 4(A), 4(B) and 4(C))
F = 1–7.5   FNo = 1:2.07–2.70   $2\omega$ = 50.8°–7.3°

| R1 = 8.204 | D1 = 0.1582 | N1 = 1.80518 | $\nu 1$ = 25.4 |
| R2 = 3.206 | D2 = 0.7006 | N2 = 1.51633 | $\nu 2$ = 64.1 |
| R3 = −7.385 | D3 = 0.0226 | | |
| R4 = 2.648 | D4 = 0.3729 | N3 = 1.69680 | $\nu 3$ = 55.5 |
| R5 = 8.786 | D5 = Variable | | |
| R6 = 6.232 | D6 = 0.0791 | N4 = 1.77250 | $\nu 4$ = 49.6 |
| R7 = 1.062 | D7 = 0.3367 | | |
| R8 = −1.283 | D8 = 0.0791 | N5 = 1.69680 | $\nu 5$ = 55.5 |
| R9 = 1.283 | D9 = 0.3051 | N6 = 1.84666 | $\nu 6$ = 23.9 |
| R10 = 19.406 | D10 = Variable | | |
| R11 = −2.432 | D11 = 0.0904 | N7 = 1.69680 | $\nu 7$ = 55.5 |
| R12 = −17.832 | D12 = Variable | | |
| R13 = 6.246 | D13 = 0.3277 | N8 = 1.65844 | $\nu 8$ = 50.9 |
| R14 = −2.291 | D14 = 0.1695 | | |
| R15 = Stop | D15 = 0.2260 | | |
| R16 = 3.439 | D16 = 0.3164 | N9 = 1.62374 | $\nu 9$ = 47.1 |
| R17 = −4.698 | D17 = 0.0979 | | |
| R18 = −2.106 | D18 = 0.1017 | N10 = 1.84666 | $\nu 10$ = 23.9 |
| R19 = −31.449 | D19 = 0.0169 | | |
| R20 = 2.521 | D20 = 0.2938 | N11 = 1.63854 | $\nu 11$ = 55.4 |
| R21 = −7.659 | D21 = 1.5106 | | |
| R22 = 45.911 | D22 = 0.0791 | N12 = 1.83400 | $\nu 12$ = 37.2 |
| R23 = 1.136 | D23 = 0.0890 | | |
| R24 = 4.423 | D24 = 0.2147 | N13 = 1.51633 | $\nu 13$ = 64.1 |
| R25 = −2.990 | D25 = 0.0169 | | |
| R26 = 1.357 | D26 = 0.3051 | N14 = 1.57099 | $\nu 14$ = 50.8 |
| R27 = −81.822 | D27 = 0.5650 | | |
| R28 = ∞ | D28 = 0.6780 | N15 = 1.51633 | $\nu 15$ = 64.1 |
| R29 = ∞ | | | |

| Variable | Focal Length | | |
| Separation | 1.0 | 2.4 | 7.5 |
| D5 | 0.11 | 1.29 | 2.10 |
| D10 | 2.30 | 0.76 | 0.39 |
| D12 | 0.18 | 0.55 | 0.12 |

Figure 5A:
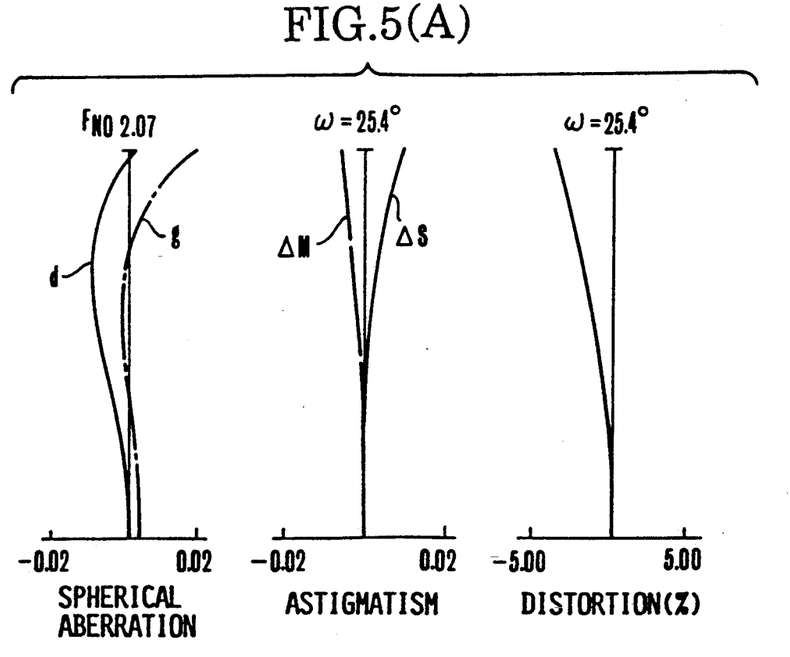
Figure 5B:
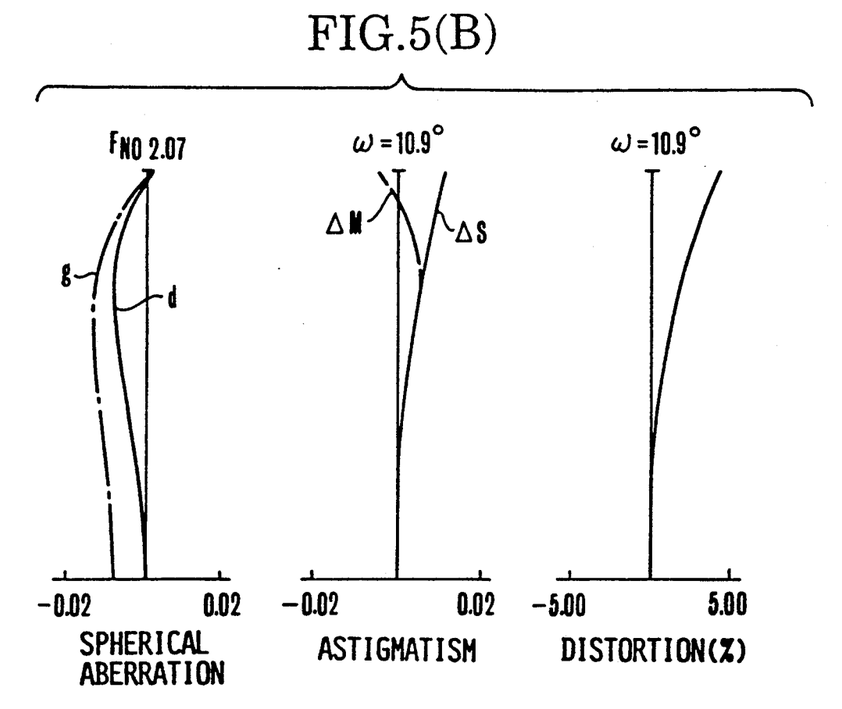
Figure 5C:
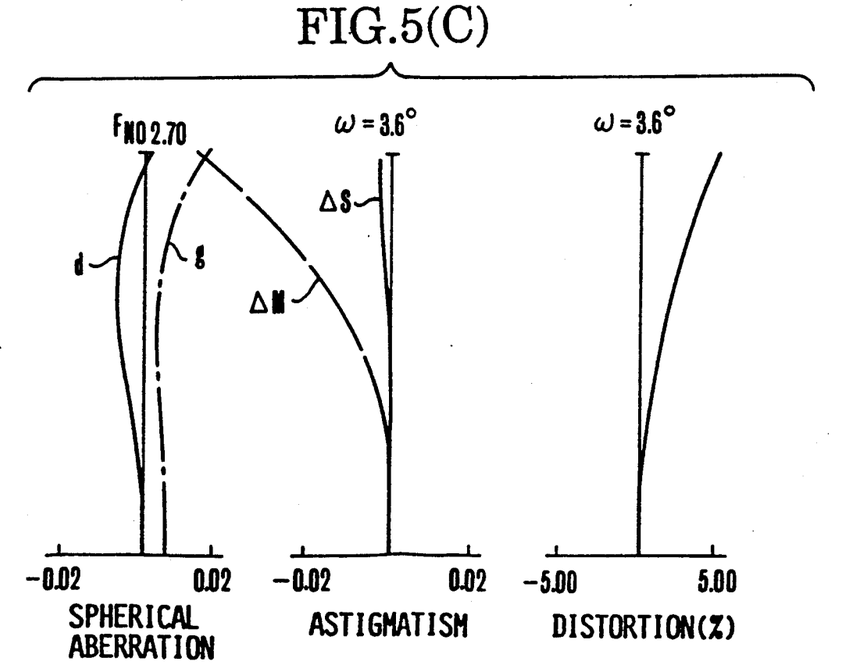

Numerical Example 4 (FIGS. 5(A), 5(B) and 5(C))
F = 1–7.5   FNo = 1:2.07–2.70   $2\omega$ = 50.8°–7.3°

-continued

| | | | |
|---|---|---|---|
| R1 = 7.458 | D1 = 0.1582 | N1 = 1.80518 | ν1 = 25.4 |
| R2 = 2.982 | D2 = 0.6893 | N2 = 1.51633 | ν2 = 64.1 |
| R3 = −7.265 | D3 = 0.0226 | | |
| R4 = 2.464 | D4 = 0.3955 | N3 = 1.69680 | ν3 = 55.5 |
| R5 = 8.512 | D5 = Variable | | |
| R6 = 8.147 | D6 = 0.0791 | N4 = 1.77250 | ν4 = 49.6 |
| R7 = 0.986 | D7 = 0.3181 | | |
| R8 = −1.208 | D8 = 0.0791 | N5 = 1.69680 | ν5 = 55.5 |
| R9 = 1.208 | D9 = 0.3051 | N6 = 1.84666 | ν6 = 23.9 |
| R10 = 22.233 | D10 = Variable | | |
| R11 = −2.262 | D11 = 0.0904 | N7 = 1.69680 | ν7 = 55.5 |
| R12 = −17.044 | D12 = Variable | | |
| R13 = 7.056 | D13 = 0.3503 | N8 = 1.65844 | ν8 = 50.9 |
| R14 = −2.043 | D14 = 0.1695 | | |
| R15 = Stop | D15 = 0.2260 | | |
| R16 = 3.044 | D16 = 0.3164 | N9 = 1.62374 | ν9 = 47.1 |
| R17 = −5.888 | D17 = 0.1099 | | |
| R18 = −2.097 | D18 = 0.1017 | N10 = 1.84666 | ν10 = 23.9 |
| R19 = −35.931 | D19 = 0.0169 | | |
| R20 = 2.530 | D20 = 0.2938 | N11 = 1.63854 | ν11 = 55.4 |
| R21 = −7.620 | D21 = 1.5569 | | |
| R22 = 120.444 | D22 = 0.0791 | N12 = 1.83400 | ν12 = 37.2 |
| R23 = 1.335 | D23 = 0.0814 | | |
| R24 = 3.688 | D24 = 0.2147 | N13 = 1.51633 | ν13 = 64.1 |
| R25 = −2.804 | D25 = 0.0169 | | |
| R26 = 1.310 | D26 = 0.3051 | N14 = 1.53172 | ν14 = 48.9 |
| R27 = −405.406 | D27 = 0.5650 | | |
| R28 = ∞ | D28 = 0.6780 | N15 = 1.51633 | ν15 = 64.1 |
| R29 = ∞ | | | |

| Variable Separation | Focal Length | | |
|---|---|---|---|
| | 1.0 | 2.5 | 7.5 |
| D5 | 0.12 | 1.20 | 1.92 |
| D10 | 2.09 | 0.66 | 0.35 |
| D12 | 0.18 | 0.52 | 0.12 |

TABLE-1

| Condition No. | Factor | Numerical Example | | | |
|---|---|---|---|---|---|
| | | 1 | 2 | 3 | 4 |
| (1) | $\dfrac{F1^2 \cdot F_{NOT} \cdot \tan\omega T}{FT^2}$ | 0.044 | 0.044 | 0.044 | 0.038 |
| (2) | $\|F2/FT\|$ | 0.12 | 0.12 | 0.12 | 0.10 |
| (3) | $\|F3/FT\|$ | 0.55 | 0.54 | 0.54 | 0.50 |
| (4) | $\left\|\dfrac{RIII2 + RIII1}{RIII2 - RIII1}\right\|$ | 1.34 | 1.33 | 1.32 | 1.31 |
| (5) | $\dfrac{F4 - 1}{F4}$ | 0.72 | 0.69 | 0.73 | 0.70 |
| (6) | $\left\|\dfrac{f4,5}{F4 - 2}\right\|$ | 0.32 | 0.31 | 0.30 | 0.31 |

According to the invention, by setting forth the rules of design for each lens unit as has been described before, the total length of the complete lens is shortened and the whole lens system is simplified, while still permitting the optical performance to be well maintained throughout the entire zooming range. The invention has thus achieved a 4-unit zoom lens of as high a range as 8 in the simple form suited to the photographic camera, video camera, etc.

What is claimed is:

1. A zoom lens comprising:
   from front to rear,
   a first lens unit having a positive refractive power;
   a second lens unit having a negative refractive power;
   a third lens unit having a negative refractive power; and
   a fourth lens unit having a positive refractive power; zooming being performed by moving said second and third lens units at the same time along an optical axis, and,
   letting the focal length of said first lens unit be denoted by F1, and the focal length of the entire lens system, the F-number at full open aperture, and the half angle of view in the telephoto end be denoted by FT, $F_{NOT}$ and $\omega T$ respectively, the following condition being satisfied:

$$0.01 < (F1^2 \cdot F_{NOT} \tan\omega T)/FT^2 < 0.049.$$

2. A zoom lens according to claim 1, further satisfying the following condition:

$$0.09 < |F2/FT| < 0.14$$

where F2 is the focal length of said second lens unit.

3. A zoom lens according to claim 2, further satisfying the following condition:

$$0.45 < |F3/FT| < 0.65$$

where F3 is the focal length of said third lens unit.

4. A zoom lens according to claim 3, wherein said first lens unit has a cemented lens of positive refractive power having a cemented surface convex toward the object side and a meniscus-shaped positive lens convex toward the object side, said second lens unit has a negative lens having a strong refracting surface facing the object side and a cemented lens of negative refractive power having a cemented surface convex toward the object side, and said third lens unit has a negative lens having a concave surface facing the object side.

5. A zoom lens according to claim 4, further satisfying the following condition:

$$1.1 < |(R_{III2}+R_{III1})/(R_{III2}-R_{III1})| < 1.6$$

where $R_{IIIi}$ is the radius of curvature of the i-th lens surface, when counted from the front, in said third lens unit.

6. A zoom lens according to claim 1, wherein focusing is carried out by moving said first lens unit along the optical axis.

7. A zoom lens comprising:
   from front to rear,
   a first lens unit having a positive refractive power;
   a second lens unit having a negative refractive power;
   a third lens unit having a negative refractive power; and
   a fourth lens unit having a positive refractive power, zooming being performed by moving said second and third lens units at the same time along an optical axis, and, letting the focal length of said second lens unit be denoted by F2, and the focal length of the entire lens system in the telephoto end be denoted by FT, the following condition being satisfied:

$$0.09 < |F2/FT| < 0.14$$

8. A zoom lens according to claim 7, further satisfying the following condition:

$$0.45 < |F3/FT| < 0.65$$

where F3 is the focal length of said third lens unit.

9. A zoom lens according to claim 8, wherein said first lens unit has a cemented lens of positive refractive power having a cemented surface convex toward the object side and a meniscus-shaped positive lens convex toward the object side, said second lens unit has a negative lens having a strong refracting surface facing the object side and a cemented lens of negative refractive power having a cemented surface convex toward the object side, and said third lens unit has a negative lens having a concave surface facing the object side.

10. A zoom lens according to claim 9, further satisfying the following condition:

$$1.1 < |(R_{III2}+R_{III1})/(R_{III2}-R_{III1})| < 1.6$$

where $R_{IIIi}$ is the radius of curvature of the i-th lens surface, when counted from the front, in said third lens unit.

11. A zoom lens according to claim 7, wherein focusing is carried out by moving said first lens unit along the optical axis.

12. A zoom lens according to claim 11, further satisfying the following condition:

$$0.01 < (F1^2 \cdot F_{NOT} \tan \omega T)/FT^2 < 0.049$$

where F1 is the focal length of said first lens unit, and FT, $F_{NOT}$ and $\omega T$ are respectively the focal length of the entire lens system, the F-number at full open aperture and the half angle of view in the telephoto end.

* * * * *

UNITED STATES PATENT AND TRADEMARK OFFICE
CERTIFICATE OF CORRECTION

PATENT NO. : 5,225,937
DATED : July 6, 1993
INVENTOR(S) : AKIHISA HORIUCHI

It is certified that error appears in the above-indentified patent and that said Letters Patent is hereby corrected as shown below:

COLUMN 2

Line 42, "where," should read --where--.

COLUMN 5

Line 24, "surface or" should read --surface, when counted from the front, Di is the i-th lens thickness or--;
Line 37, "2=0.7017" should read --D2=0.7017--; and
Line 42, "D7=0.3327" should read --D7=0.3367--.

COLUMN 6

Line 67, "5(C)" should read --5(C))--.

COLUMN 8

Line 3, "power;" should read --power,--.
Line 40, "$1.1 < |R_{m2}+R_{m1})/(R_{m2}-R_{m1})| < 1.6$"
   should read --$1.1 < |(R_{m2}+R_{m1})/(R_{m2}-R_{m1})| < 1.6$--

Signed and Sealed this

Twelfth Day of April, 1994

Attest:

*Attesting Officer*

BRUCE LEHMAN

*Commissioner of Patents and Trademarks*